July 27, 1948.  H. W. GROSJEAN ET AL  2,445,913

MUD AND SNOW HOOKS FOR VEHICLE TIRES

Filed May 6, 1946

INVENTORS
HARRY W. GROSJEAN
ANDREW ZINDA
ELMER M.A. SIZER

BY

ATTORNEYS

Patented July 27, 1948

2,445,913

UNITED STATES PATENT OFFICE 2,445,913

MUD AND SNOW HOOKS FOR VEHICLE TIRES

Harry W. Grosjean and Elmer M. A. Sizer, Milwaukee, Wis., and Andrew Zinda, Portland, Oreg.

Application May 6, 1946, Serial No. 667,604

2 Claims. (Cl. 152—225)

Our invention refers to quick adjustable tractor attachments for pneumatic tires adapted to be used on any type of vehicle.

The primary object of our invention is to provide a plurality of shoes, of the hook type, adapted to be fitted to the tread of a pneumatic vehicle tire, the same having radial legs disposed, with reference to the wheel axis, and connected adjustable draw-rods, whereby the group of shoes or hooks may be quickly clamped, or anchored in position, about the tire to serve as lags, to frictionally revolve around the wheel, without spinning, under all road conditions, whereby undue strain is eliminated from the anchor means; under load conditions, when the shoes, through their extra pulling power, will cause the wheel to travel out of all snow or gummy ruts.

A further object of our invention is to utilize the radially disposed anchor means for the shoes, whereby load strain will eliminate bending or twisting of said anchor means.

A further object of our invention is to provide the clamping of anchor legs in pivotal connection, with yokes, having means for firmly holding the legs in their converging positions, the said yokes being drawn together, or spread apart, by spaced tie-rods in threaded or unthreaded union with the yokes.

A further object of our invention is to provide the shoes, or hooks, so spaced apart, with relation to the tread of the tire, that the entire equipment may be adjusted to the wheel without raising or rotating the same.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 1:
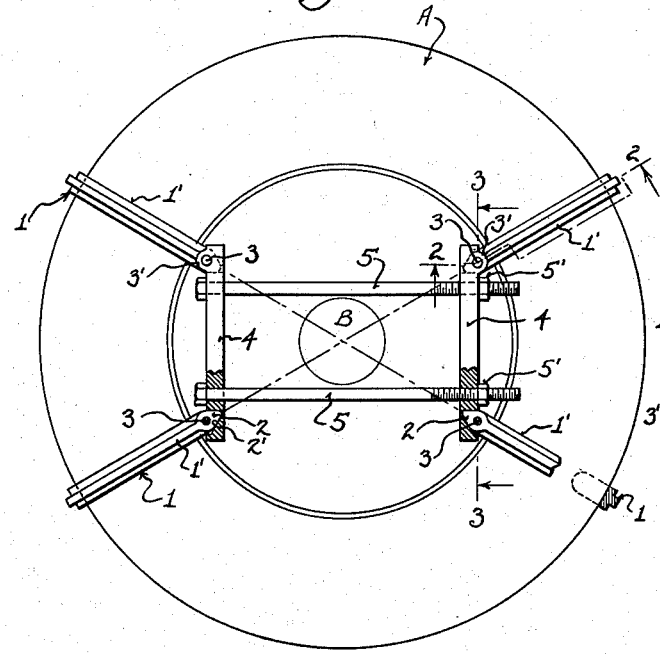
Fig. 1 represents a face view of a shoe attachment, embodying the features of our invention, fitted to a pneumatic tire, certain parts being broken away and in section to more clearly illustrate structural features.
Figure 2:
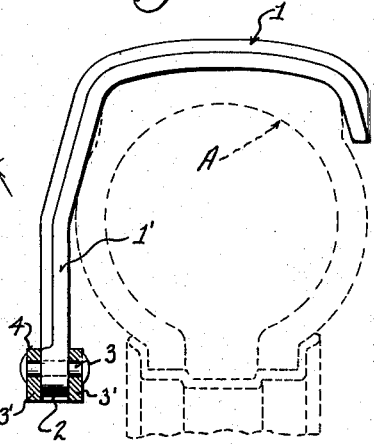
Fig. 2 is an enlarged fragmentary side elevation of one of the shoes or hooks fitted to a pneumatic tire and wheel portion in dotted lines, said view being partly in section as indicated by line 2—2 of Fig. 1.
Figure 3:
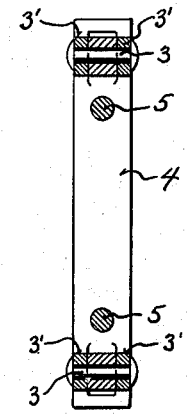
Fig. 3 is a detail plan sectional view of a yoke connection for the shoes, the same being partly in section, as indicated by line 3—3 of Fig. 1.

Referring by characters to the drawings, with especial reference to Figs. 1 to 3 inclusive, A indicates a pneumatic tire, mounted upon a wheel having a hub B.

Fitted to the tire tread are pairs of hooks or shoes 1, which shoes are ribbed for strengthening and traction purposes. Each shoe has a depending leg 1' and said shoes, in this exemplification of our invention, are provided in pairs, it being understood that the legs 1' of each shoe are radially disposed, whereby an imaginary line, intersecting the opposite shoes, will also intersect the axis of the wheel hub B.

The legs of each pair of shoes terminate with V shaped noses 2, which noses are apertured for the reception of pins 3 that also engage ears 3' of yokes 4, it being understood that the pair of yokes are in parallel relations. The yokes are provided with companion apertures suitably spaced apart for the reception of headed tie-rods 5, ends of which tie-rods are threaded and passed through the companion yoke.

The V shaped nose of each shoe leg 1' engages a corresponding socket 2' in the yoke, whereby the shoe is positively held in a radial position, with respect to the wheel axis.

When it is desired to adjust the shoe traction means to the tread of a tire, nuts 5', in threaded union with the ends of tie-rods, are rotated to snugly draw the companion yokes together, whereby the desired clamping pressure of the shoes upon the tire tread is insured.

From the above description it will be noted that the shoe equipment can be readily inserted upon the tread of a tire, free from the ground line, and, due to the fact that the group of said shoes being radially disposed, when load strain is put upon them, the tendency of twisting or bending any of the parts is relieved, and any rotating slippage of the shoe or shoes on the tire would cause the shoe or shoes to grip the tire more firmly.

Figure 4:
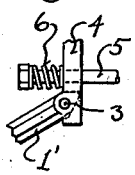
Fig. 4 is fragmentary front elevation of a modified form of a yielding connection between one of the leg yokes and tie-rods.

As indicated in Fig. 4 of the drawings, in some instances we may insert coil springs 6 between one of the yokes and the heads of the tie-rods, said springs being coiled about said rods.

Figure 5:
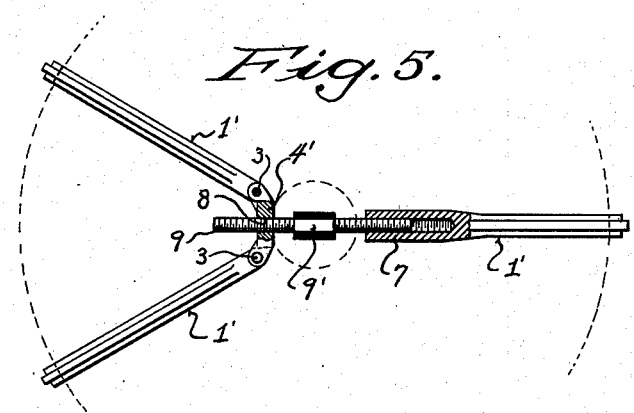
Fig. 5 is a face view of another form of our invention, wherein triplicate shoes are employed having a single tie-rod connection.

As illustrated in Fig. 5 of the drawings, a modified form of our invention is shown, wherein a single yoke 4' is employed for pivotal connection between legs 1' of a pair of radially disposed shoes. A third shoe is then fitted to the tread of a tire, the leg 1' of which terminates with a threaded sleeve 7, as shown, this sleeve being radially positioned with reference to the axis of the wheel. The yoke 4', in this exemplification of our invention, is provided with a threaded aperture 8 for the reception of one end of a threaded tie-rod 9, the same having its opposite end in threaded union with the sleeve 7. This tie-rod is formed with a central wrench receiving head 9', whereby the tie-rod, when rotated in one direction, will cause the three shoes to be drawn tightly into position against the tire tread, and reversely, when it is desired to disconnect the shoe group from the tread, it being understood that the threaded ends of said tie-rod are right and left respectively.

Figure 6:
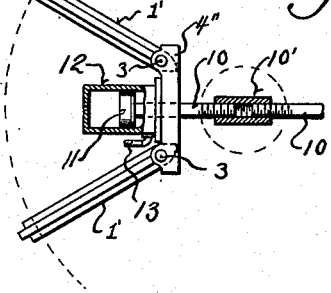
Fig. 6 is another modified form of our invention, wherein the tie-rod for connecting the yokes is provided with a fluid pressure means embodying a cylinder and piston rod.
Figure 6:
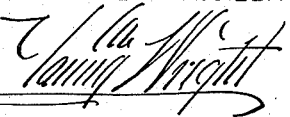

Referring now to the modified form of our invention shown in Fig. 6, a sectional single tie-rod 10 is provided having right and left threaded ends for connection to a turn-buckle 10', it being understood that the sectional end of said tie-rod, which is broken away, may have attached thereto either a pair of hooks or a single hook.

The upper section of this tie-rod passes through an aperture in the yoke 4" and terminates with a piston head 11. The piston head is reciprocatively mounted in a cylinder 12, which cylinder is suitably secured to the yoke and is provided with a nipple 13, through which a suitable fluid, under pressure, may be injected into the bottom of the cylinder, whereby the piston head is under fluid pressure, it being understood that under certain conditions, we may, without departing from the spirit of our invention, utilize some yielding means associated with the tie-rods and group of shoes.

We claim:

1. In a wheel having a pneumatic tire; a traction attachment therefor comprising pairs of tread shoes, radially disposed legs extending therefrom, a yoke in pivotal union with each pair of shoe legs, spaced threaded end tie-rods connecting the yokes, and nuts in threaded connection with the tie-rods for tightening or loosening the shoes relative to the tire tread.

2. In a wheel having a pneumatic tire, a tractor attachment thereby comprising pairs of shoes radially disposed legs extending therefrom, a yoke having end sockets in pivotal union with each pair of shoe legs, a nose extending from the end of each leg engaging a yoke socket for holding the legs in radial positions, spaced parallel tie rods engaging the yokes and nuts engaging the tie rods for tightening or loosening the shoes relative to the tire tread.

HARRY WM. GROSJEAN.
ELMER M. A. SIZER.
ANDREW ZINDA.

REFERENCES CITED

The following references are of record in the file of this patent:

UNITED STATES PATENTS

| Number | Name | Date |
|---|---|---|
| 1,249,969 | Kester | Dec. 11, 1917 |
| 2,352,788 | Hinds | July 4, 1944 |